US008005807B2

United States Patent
Nouri et al.

(10) Patent No.: US 8,005,807 B2
(45) Date of Patent: *Aug. 23, 2011

(54) OBJECT ORIENTED QUERY PATH EXPRESSION TO RELATIONAL OUTER JOIN TRANSLATOR METHOD, SYSTEM, AND ARTICLE OF MANUFACTURE, AND COMPUTER PROGRAM PRODUCT

(75) Inventors: Ahmad Nouri, San Jose, CA (US); David J. Wisneski, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 565 days.

This patent is subject to a terminal disclaimer.

(21) Appl. No.: 12/024,978

(22) Filed: Feb. 1, 2008

(65) Prior Publication Data

US 2008/0140614 A1    Jun. 12, 2008

Related U.S. Application Data

(63) Continuation of application No. 10/669,934, filed on Sep. 23, 2003, now Pat. No. 7,426,522.

(51) Int. Cl.
*G06F 17/30* (2006.01)
(52) U.S. Cl. ...................................................... 707/705
(58) Field of Classification Search .......... 707/2, 103 R, 707/705
See application file for complete search history.

(56) References Cited

U.S. PATENT DOCUMENTS

| | | |
|---|---|---|
| 5,367,675 A | 11/1994 | Cheng et al. |
| 5,548,754 A | 8/1996 | Pirahesh et al. |
| 5,557,791 A | 9/1996 | Cheng et al. |
| 5,598,559 A | 1/1997 | Chaudhuri |
| 5,687,362 A | 11/1997 | Bhargava et al. |
| 5,724,570 A | 3/1998 | Zeller et al. |
| 5,761,657 A | 6/1998 | Hoang |
| 5,774,692 A | 6/1998 | Boyer et al. |
| 5,797,136 A | 8/1998 | Boyer et al. |
| 5,826,077 A | 10/1998 | Blakeley et al. |
| 5,832,477 A | 11/1998 | Bhargava et al. |
| 5,864,847 A | 1/1999 | Goel et al. |
| 5,873,093 A | 2/1999 | Williamson et al. |
| 5,899,997 A | 5/1999 | Ellacott |
| 5,960,428 A | 9/1999 | Lindsay et al. |

(Continued)

OTHER PUBLICATIONS

Ambler, S., "Enterprise JavaBean Persistence 201", Software Development, v8, n10, Oct. 2000, 5pp.
MVCSOFT Inc, "Persistence Manager", Part I, 2000-2001, 143 pp.
MVCSOFT Inc, "Persistence Manager", Part II, 2000-2001, 87 pp.

(Continued)

*Primary Examiner* — Etienne P LeRoux
(74) *Attorney, Agent, or Firm* — David W. Victor; Konrad Raynes & Victor LLP

(57) ABSTRACT

Provided is an object oriented query path expression to relational outer join translator. A path expression, comprising a navigation path through a relationship in a schema, in an object oriented query is translated to a relational database outer join by analyzing each path expression defined in each level of the object oriented query, and by identifying each path expression which can be a candidate for a translation to an outer join. A quantifier is created for each path expression. A translation of the object oriented query to a relational query is then completed. An optimization may also be performed on the grouped quantifiers. After the optimization, an inner join is generated for each quantifier which remains a candidate for a translation to an inner join, and an outer join is generated for each quantifier which remains a candidate for a translation to an outer join.

8 Claims, 9 Drawing Sheets

U.S. PATENT DOCUMENTS

| | | |
|---|---|---|
| 5,963,933 A | 10/1999 | Cheng et al. |
| 6,122,627 A | 9/2000 | Carey et al. |
| 6,134,540 A | 10/2000 | Carey et al. |
| 6,160,549 A | 12/2000 | Touma et al. |
| 6,167,399 A | 12/2000 | Hoang |
| 6,219,663 B1 | 4/2001 | Baxter et al. |
| 6,226,637 B1 | 5/2001 | Carey et al. |
| 6,285,997 B1 | 9/2001 | Carey et al. |
| 6,411,951 B1 | 6/2002 | Galindo-Legaria et al. |
| 6,640,221 B1 | 10/2003 | Levine et al. |
| 6,826,558 B2 | 11/2004 | Slutz |
| 6,941,298 B2 | 9/2005 | Chow et al. |
| 7,010,542 B2 | 3/2006 | Trappen et al. |
| 7,082,433 B2 | 7/2006 | Anonsen et al. |
| 7,152,073 B2 | 12/2006 | Gudbjartsson et al. |
| 7,426,522 B2 * | 9/2008 | Nouri et al. ............ 1/1 |
| 2005/0065927 A1 | 3/2005 | Nouri et al. |

OTHER PUBLICATIONS

Amendment 1, Aug. 2, 2006, for U.S. Appl. No. 10/669,934, Total 14 pp.

Amendment 2, Aug. 21, 2007, for U.S. Appl. No. 10/669,934, Total 12 pp.

Final Office Action 1, Oct. 19, 2006, for U.S. Appl. No. 10/669,934, Total 11 pp.

Notice of Allowance 1, Nov. 2, 2007, for U.S. Appl. No. 10/669,934, Total 21 pp.

Notice of Appeal & Pre-Appeal Brief Request for Review, Jan. 19, 2007, for U.S. Appl. No. 10/669,934, Total 7 pp.

Office Action 1, May 2, 2006, for U.S. Appl. No. 10/669,934, Total 13 pp.

Office Action 3, May 21, 2007, for U.S. Appl. No. 10/669,934, Total 14 pp.

* cited by examiner

# OBJECT ORIENTED QUERY PATH EXPRESSION TO RELATIONAL OUTER JOIN TRANSLATOR METHOD, SYSTEM, AND ARTICLE OF MANUFACTURE, AND COMPUTER PROGRAM PRODUCT

CROSS-REFERENCE TO RELATED APPLICATIONS

This patent application is a continuation of U.S. patent application Ser. No. 10/669,934, filed Sep. 23, 2003, which patent application is incorporated herein by reference in its entirety.

BACKGROUND OF THE INVENTION

1. Field of the Invention

The present invention relates in general to computer programs, and more particularly to translating a path expression of an object oriented query into relational joins.

2. Description of the Related Art

Enterprise JavaBeans (EJB) is a specification of an architecture for developing and deploying component-based distributed applications. Distributed applications developed using the Enterprise JavaBeans architecture are scalable, transactional, and multi-user secure. Such a distributed application may be written once, and then deployed on various server platforms supporting the Enterprise JavaBeans specification. An EJB architecture comprises an EJB server, EJB containers that execute on the EJB server, and EJB's that execute in these EJB containers. EJB servers and EJB containers are developed and deployed by various middleware providers, and an application developer may use the EJB components to develop and deploy a component-based distributed application.

Enterprise Java Beans 2.0 (EJB 2.0) defines an EJB Query Language (EJBQL) which provides a solution for defining portable finder methods for container managed persistence (CMP) entity beans. Prior to EJB QL, the specification of CMP finder methods for a bean was vendor specific. If such a vendor specific bean is deployed into a different database having a different database schema mapping, then the vendor specific finder helper methods must be redefined. EJB Query Language makes the specification of finder methods easier and more portable.

The EJB Query Language provides a construct known as a path expression which specifies a navigation route from a previously referenced schema to a new schema. A path expression may appear in an EJB QL query in either a SELECT clause, a WHERE clause, or a FROM clause, and thus path expressions affect both the scope and the results of an EJB QL query). However, although an EJB QL query may be converted into a SQL query to execute against a database, the path expressions are extensions not found in SQL.

Path expressions may be translated to SQL joins operations when EJB's are mapped to relational tables. Path expressions in the SELECT clause are translated to a left outer join, path expressions in the FROM clause are translated to an inner join, and path expressions in the WHERE clause can be translated to either an inner join or an outer join depending on usage context. The translated SQL then consists a mixture of inner and left outer joins operations. Although a series of inner joins can appear in any order, the order of a mixture of inner joins and outer joins is critical for both the validity and performance of the query.

Thus, there is a clearly felt need for an improved translation of a path expression of an object oriented query into relational joins.

SUMMARY OF THE INVENTION

Preferred embodiments of the present invention comprise a method, system, article of manufacture, and computer program product for translating a path expression of an object oriented query into relational joins.

In accordance with a preferred embodiment of the present invention, a path expression, comprising a navigation path through a relationship in a schema, in an object oriented query is translated to a relational database outer join by analyzing each path expression defined in each level of the object oriented query, and by identifying each path expression which can be a candidate for a translation to an outer join. The path expression are ordered starting with quantifiers defined in a FROM clause, to which are added each path expression identified as a candidate for a translation to an outer join. These ordered path expressions are input to a select operator for each level of the object oriented query, and the ordered path expressions are grouped sequentially based upon on a source-target dependency between ordered path expressions and based upon the identifications as a candidate for a translation to an outer join. A quantifier is created for each path expression, said quantifier comprising a variable representing a table in a relational database, and each grouped path expression is replaced with a related table in a relational database, and a translation of the object oriented query to a relational query is completed.

In accordance with an aspect of a preferred embodiment of the present invention, an optimization may also be performed on the grouped quantifiers to improve performance in which the optimization identifies quantifiers which can be a candidate for a translation to an inner join.

In accordance with another aspect of a preferred embodiment of the present invention, after the optimization, an inner join is generated for each quantifier which remains a candidate for a translation to an inner join, and an outer join is generated for each quantifier which remains a candidate for a translation to an outer join.

In accordance with another aspect of a preferred embodiment of the present invention, the optimization identifies a quantifier as a candidate for a translation to an inner join if a corresponding path expression is defined with a NOT NULL foreign key.

In accordance with another aspect of a preferred embodiment of the present invention, the optimization identifies a quantifier as a candidate for a translation to an inner join if a corresponding path expression is used in a FROM clause.

In accordance with another aspect of a preferred embodiment of the present invention, the optimization identifies a quantifier as a candidate for a translation to an inner join if a LIKE, IN, or BETWEEN operator exists in a WHERE clause containing a corresponding path expression.

In accordance with another aspect of a preferred embodiment of the present invention, the optimization identifies a quantifier as a candidate for a translation to an inner join if an EQUAL, LESS THAN, GREATER THAN, LESS THAN OR EQUAL, GREATER THAN OR EQUAL, NOT EQUAL, or NOT NULL operator exits in a WHERE clause.

A preferred embodiment of the present invention has the advantage of providing improved translation of an object oriented query into a relational query.`

A preferred embodiment of the present invention has the advantage of providing improved translation of an object oriented query comprising a path expression into a relational query.

A preferred embodiment of the present invention has the advantage of providing improved performance of a relational query translation of a path expression.

A preferred embodiment of the present invention has the advantage of providing improved access and manipulation of database null values.

A preferred embodiment of the present invention has the advantage of providing improved SELECT queries comprising clauses such as EMPTY, MEMBER OF, and EXIST.

BRIEF DESCRIPTION OF THE DRAWINGS

For a more complete understanding of the present invention and the advantages thereof, reference is now made to the Description of the Preferred Embodiment in conjunction with the attached Drawings, in which.

DESCRIPTION OF THE PREFERRED EMBODIMENT

An embodiment of the invention is now described with reference to the figures where like reference numbers indicate identical or functionally similar elements. Also in the figures, the left most digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other devices and applications.

Figure 1:
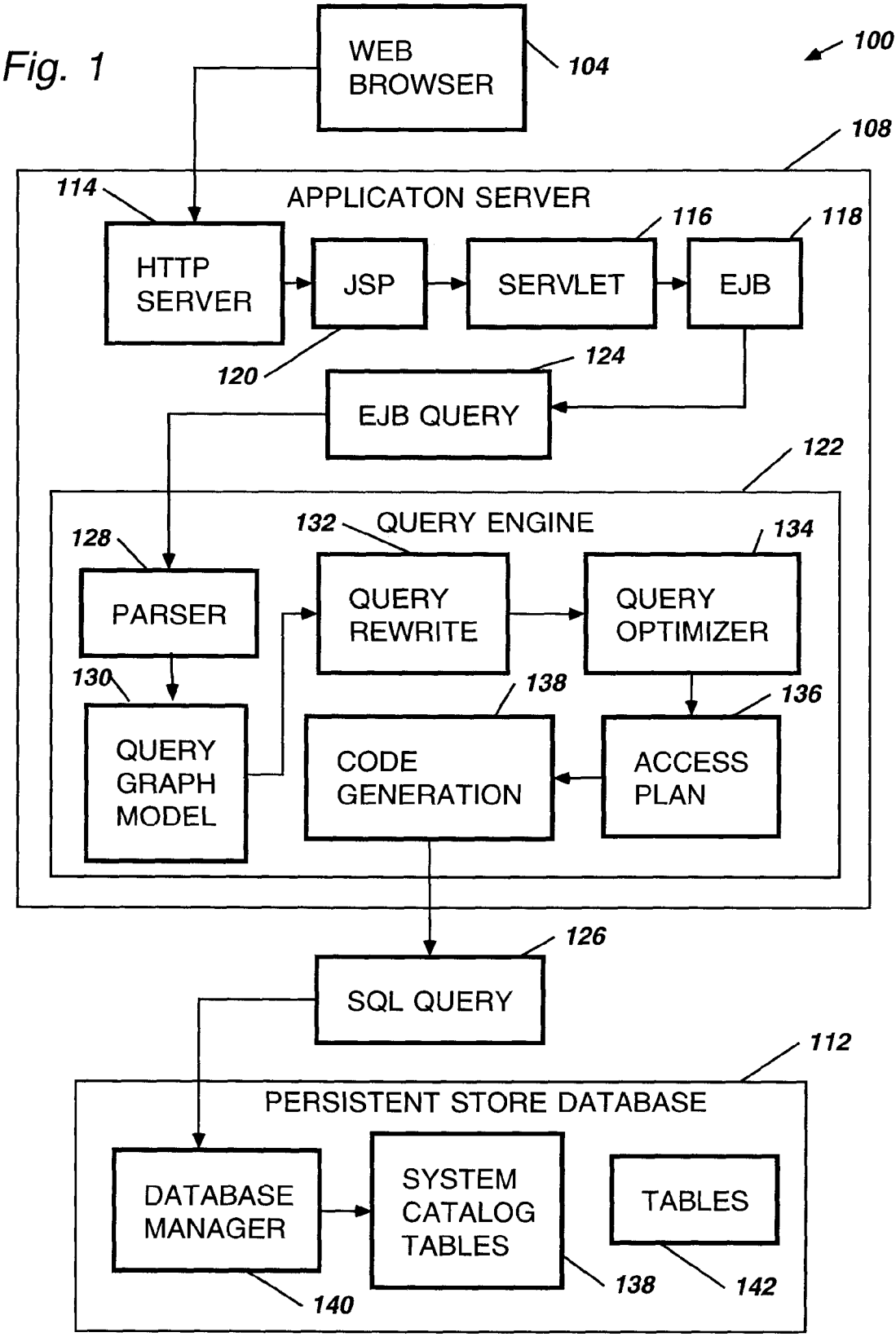
FIG. 1 is a block diagram of a preferred embodiment of the present invention.

FIG. 1 illustrates an e-business application environment 100 which facilitates the building, running, and management of multi-tiered, web-enabled e-business applications. The application environment 100 usually comprises three tiers: a first tier comprising a web browser 104; a second middle tier comprising an application server 108; and a third tier comprising a persistent store 112. The first tier web browser 104 is provided services through an HTTP server 114 by a servlet 116 executing on the application server 108. The servlet 116 may comprise one or more Enterprise JavaBeans (EJB) 118. These EJB's 118 use the persistent store 112 for container-managed persistence (CMP). A query against the persistent store 112 is mapped from EJBQL to the native query language of the persistent store 112.

Web browsers 104, pervasive devices, PCs and other tier one devices may access an HTTP server 114 on the middle tier 108 within the application server environment 100. This access may invoke Java Server Pages (JSP) 120 or servlets 116, managed by the application server 108, that access the tier three persistent store 112 data using Java Database Connectivity (JDBC), SQL for Java (SQLJ), or JB Query Language (EJBQL).

The persistent store 112 stores state information for servlets 116 and EJB session beans 118, and it serves as backend storage for bean-managed and container-managed persistence for EJBs 118. JSPs 120 and servlets 116 may also indirectly access a remote data source 112 using EJBs 118, that are invoked using remote method invocation. In addition to web browsers 104, other types of client applications can invoke EJBs 118 directly by remote method invocation.

Session and entity beans execute business logic on the middle tier 108. Both can customize their access to data using container-managed persistence. The EJB 2.0 draft specification includes an EJB Query Language that defines finder and select methods to facilitate the use of CMP by entity beans. For the entity beans 118 to access data in the persistent store 112, the EJBQL query 124 is translated into the native language of the persistent store, such as a SQL query 126, by an EJB query engine 122.

The translation and compilation of an EJBQL query 124 into a SQL query 126 comprises several steps: parsing the query 128, building a query graph model 130, rewriting the query 231, optimizing the query 234, and generating an executable access plan 136.

The query engine parser 128 parses the query 124 to validate the syntax and semantics, and to create a query graph model (QGM) 130 which is an internal, in-memory database that is used to represent the query throughout the query compilation process.

The query rewrite component 132 of the query engine 122 uses the global semantics provided in the query graph model 130 to transform the query 124 into a form that can be optimized more easily. For example, the query rewrite component 132 might move a predicate, altering the level at which it is applied and potentially improving query performance.

The optimizer portion 134 of the query engine 122 uses the query graph model 130 as input, and generates many alternative execution plans 136 for satisfying the user's request. It estimates the execution cost of each alternative plan 136, using the statistics for tables, indexes, columns and functions, and chooses the access plan 136 with the smallest estimated execution cost. The output from this step is an access plan 136.

In the code generation component 138, the query engine 122 uses the access plan 136 and the query graph model 130 to create an executable access plan 136, or section, for the query. Code generation 138 uses information from the query graph model 130 to avoid repetitive execution of expressions that only need to be computed once for a query. Information about access plans 136 is stored in the system catalog tables 138. When the executable access plan 136 is executed, the database manager 140 uses the information stored in the system catalog tables 138 to determine how to access the data stored in tables 142 and provide results for the query.

In order to translate an EJB QL query containing a path expression to a valid SQL query with improved performance, the preferred embodiment of the present invention alters the operation of the above parser, query rewrite, optimization, and code generation components as described below.

Figure 2:
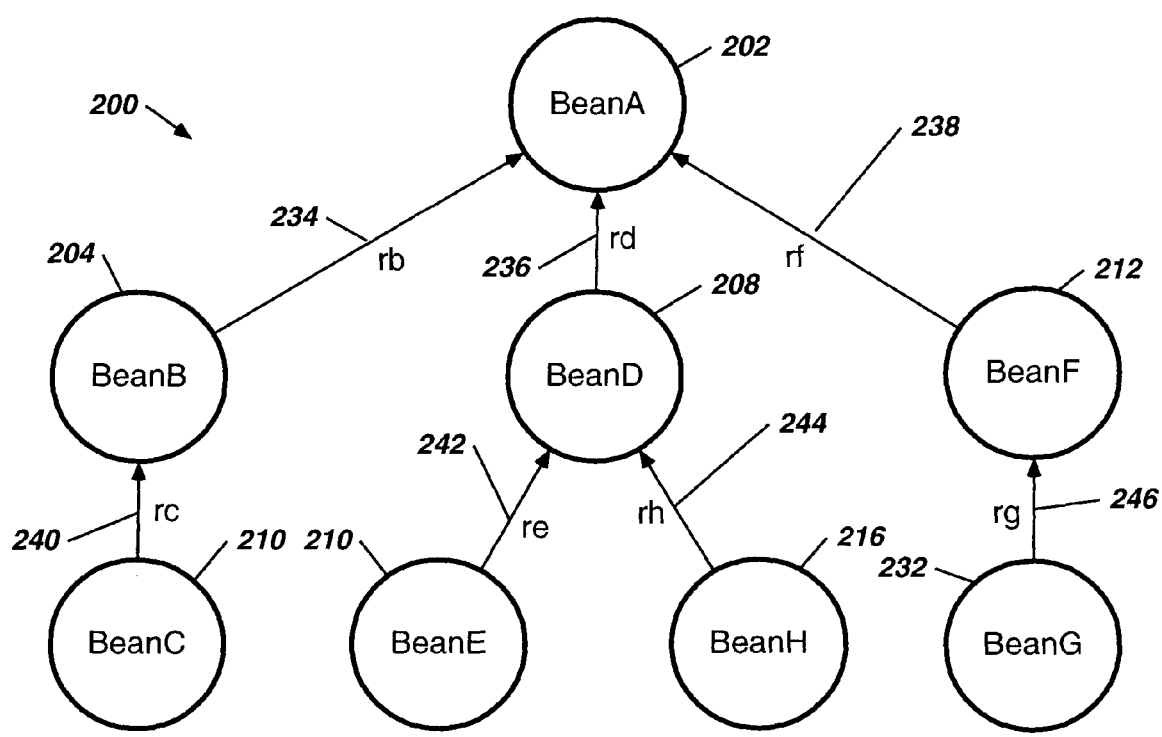
FIG. 2 illustrates an object oriented hierarchy comprising a model of a plurality of related enterprise java beans.
Figure 3:
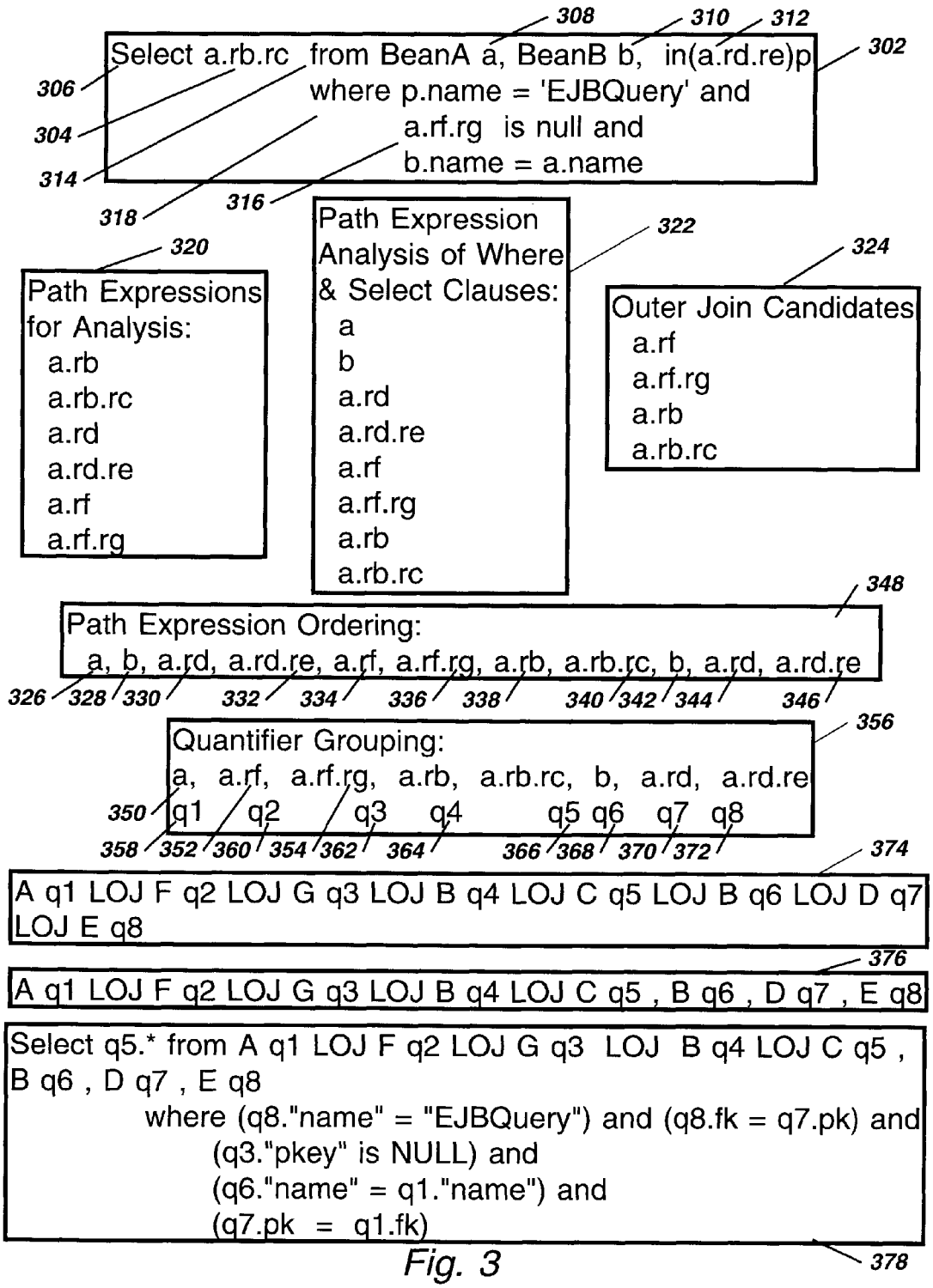
FIG. 3 illustrates application of a preferred embodiment of the present invention on the object oriented hierarchy of FIG. 2 comprising a model of a plurality of related enterprise java beans.
Figure 4:
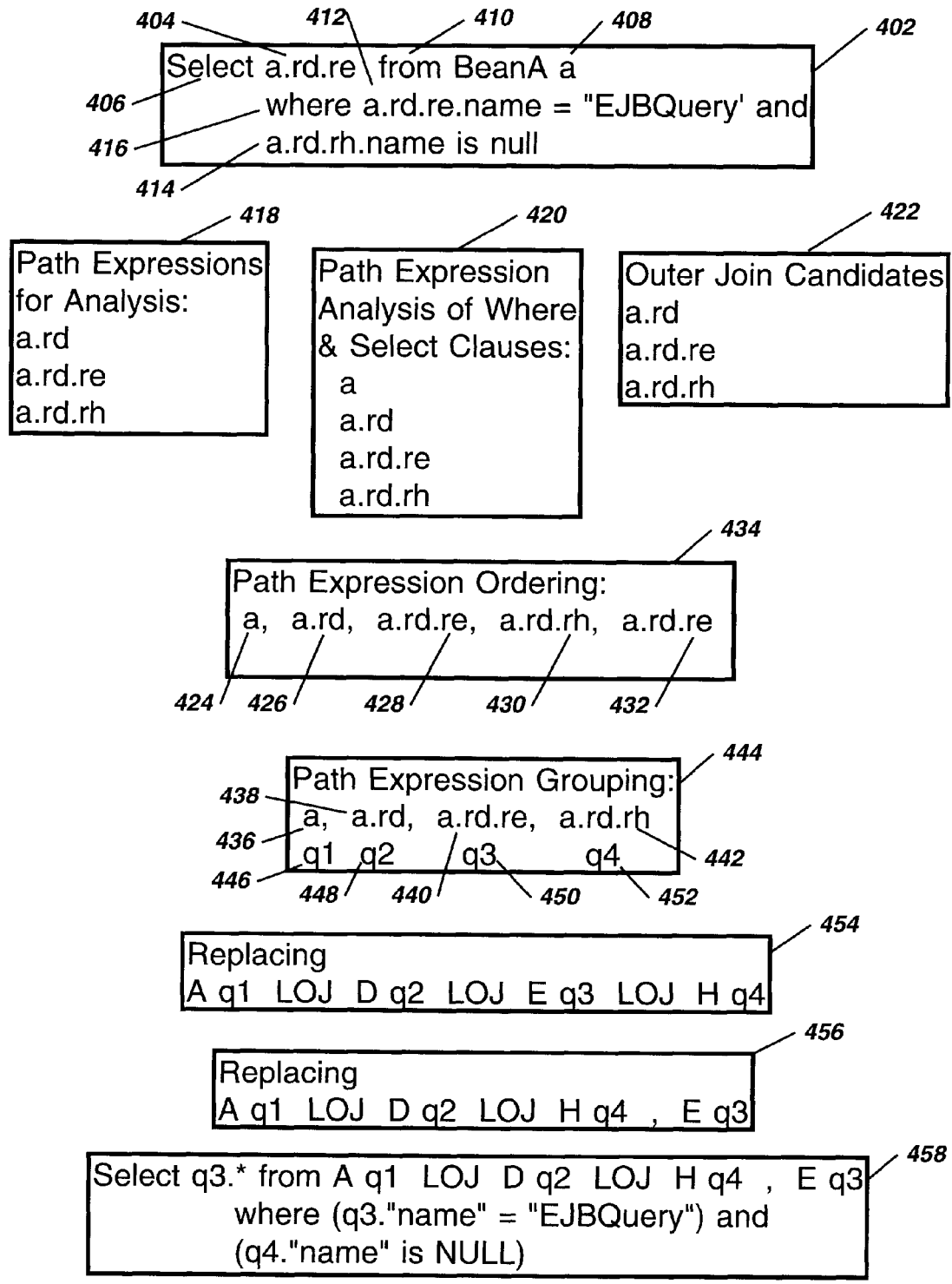
FIG. 4 illustrates a second application of the preferred embodiment of the present invention on the object oriented hierarchy of FIG. 2 comprising a model of a plurality of related enterprise java beans.
Figure 5:
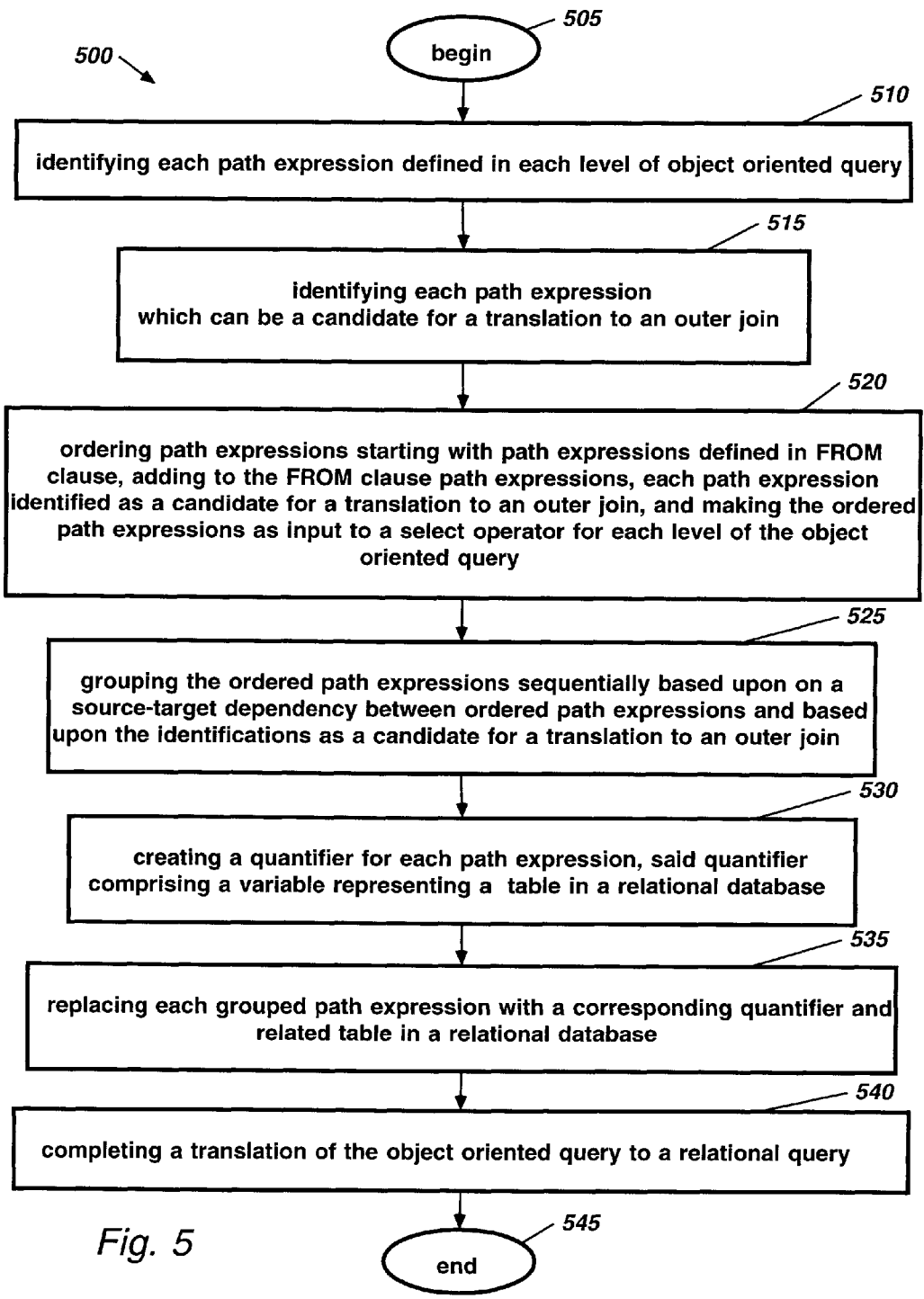
FIG. 5, FIG. 6, FIG. 7, and FIG. 8 are flowcharts of method steps preferred in carrying out a preferred embodiment of the present invention.

Referring now to FIG. 2, an application of a preferred embodiment of the present invention on an object oriented hierarchy is illustrated. Assume an application having an EJB model comprising a tree 200 of eight EJBs: BeanA 202, BeanB 204, BeanC 206, BeanD 208, BeanE 210, BeanF 212, BeanG 214, and BeanH 216. These beans are mapped to database tables A 218, B 220, C 222, D 224, E 226, F 228, G 220, and H 232, respectively. BeanA 202 has 1:1/M:1 relationship (rb) 234 with BeanB 204, 1:1/M:1 relationship (rd) 236 with BeanD 208, and 1:1/M:1 relationship (rf) 238 with BeanF 212. BeanB 204 has 1:1/M:1 relationship (rc) 240 with BeanC 206. BeanD 208 has 1:M relationship (re) 242 with BeanE 210 and 1:1/M:1 relationship (rh) 244 with BeanH 216. BeanF 212 has 1:1/M:1 relationship (rg) 246 with BeanG 214.

The symbol "OJ" represents an outer join, symbol "IJ" represents an inner join, and the symbol "," represents a Cartesian product between two tables. An outer join is a relational algebra operator that performs an extended join operation in which the tuples or rows of one relation or table that have no counterpart in a second relation or table appear in the resulting relation concatenated with all null values. A Cartesian product is a relational algebra operator that produces a relation or table that contains all possible ordered concatenations or joinings of records from two existing tables that meet certain specified criteria on the data values. An inner join is equivalent to a Cartesian product followed by a select applied to the resulting table. A lower case first letter of a bean name represents an identification variable for each Bean. (e.g. "a" is identification variable for BeanA).

Assume that the following EJB query 302 in the EJB query language is executed over the EJB model 200:

---

EJB Query:
    Select a.rb.rc from BeanA a, BeanB b, in(a.rd.re)p
        where p.name = 'EJBQuery' and
        a.rf.rg is null and
        b.name = a.name

---

The EJB query 302 contains five path expressions, "a.rb.rc" 304 in the SELECT clause 306, "a" 308, "b" 310, and "a.rd.re" 312 in the FROM clause 314, and "a.rf.rg" 316 in the WHERE clause 318. In accordance with the preferred embodiment of the present invention, each of these path expressions (304, 308, 310, 312, and 316) comprising navigation paths through relationships in a schema in the object oriented query 302 are translated to either a relational database outer join or a relational database inner join by the performance of the following described process. The process begins by identifying each path expression defined in each level of the object oriented query to identify path expressions for analysis. Thus, the process identifies the path expressions "a.rb.rc" 304 in the SELECT clause, "a.rd.re" 312 in the FROM clause, and "a.rf.rg" 316 in the WHERE clause to identify a list of path expressions for analysis 320 comprising "a.rb", "a.rb.rc", "a.rd", "a.rd.re", "a.rf", and "a.rf.rg".

The list of identified path expressions 320 is then analyzed to yield a path analysis of the FROM. SELECT, and WHERE clause path expressions. The path expression analysis produces a list 322 of path expressions to be evaluated as candidates for translation to an outer join comprising "a", "b", "a.rd", "a.rd.re", "a.rf", "a.rf.rg", "a.rb", and "a.rb.rc".

From the list 322 produced by the path expression analysis, each path expression is evaluated to determine if the path expression is a candidate for a translation to an outer join. This evaluation applies rules, including but not limited to the following rules, to determine if a path expression is a candidate for a translation to a left outer join:

If the path expression is in a SELECT, GROUP BY, ORDER BY, or HAVING clause;

If the path expression is in a WHERE clause with a NULL or OR operator;

If the path expression is in a WHERE clause which is NULL; or

If the path expression is in an outer join in a WHERE clause, then outer join candidate.

Applying these rules to the identified path expressions "a", "b", "a.rd", "a.rd.re", "a.rf", "a.rf.rg", "a.rb", and "a.rb.rc" of the list 322 of path expressions to be evaluated as candidates for translation to an outer join produces a list of outer join candidates 324 comprising path expressions "a.rf", "a.rf.rg", "a.rb", and "a.rb.rc".

The path expressions are ordered beginning with the identified path expressions defined in the FROM clause 314, to which are concatenated the path expressions 324 identified as candidates for a translation to an outer join from any WHERE clause 318 or any SELECT clause 306, to which are concatenated any remaining path expressions from any WHERE clause 318 or any SELECT clause 306 which are not identified as candidates for a translation to an outer join. The FROM clause 314 ordering comprises path expression a 326, path expression b 328, path expression "a.rd" 330, and path expression "a.rd.re" 332. The ordering of the FROM clause path expressions results in the initial sequence of path expressions "a, b, a.rd, a.rd.re" to which is concatenated the path expressions from the WHERE clause 318 and SELECT clause 306 identified as a candidate for a translation to an outer join. The path expressions identified as a candidate for a translation to an outer join comprise path expressions "a.rf" 334, "a.rf.rg" 336, "a.rb" 338, and "a.rb.rc" 340. The remaining path expressions from the WHERE clause 318 and SELECT clause 306 which are not identified as candidates for a translation to an outer join comprise path expressions "b" 342, "a.rd" 344, and "a.rd.re" 346. This produces the following path expression ordering 348:

a, b, a.rd, a.rd.re, a.rf, a.rf.rg, a.rb, a.rb.rc, b. a.rd, a.rd.re

These ordered path expressions 348 are input to a select operator for each level of an object oriented query, and the ordered path expressions 348 are grouped sequentially based upon the identifications as a candidate for a translation to an outer join (outer join candidates preceding inner join candidates), and based upon a source-target dependency between the ordered path expressions 348. In this source-target dependency ordering, a source of a relationship precedes a target of a relationship, i.e., a 350 representing the source BeanA 202 of the hierarchy preceding all other path expressions, and a.rf 352 preceding a.rf.rg 354 due to BeanG 232 being the target and BeanF 212 being the source in relationship rg 246 and due to BeanF 212 being the target and BeanA 202 being the source in relationship rf 238. Duplicate path expressions are also eliminated. In this example, duplicates b 328, a.rd 330, and a.rd.re 332 are eliminated from the path expressions resulting from the FROM clause as b 342, a.rd 344, and a.rd.re 346 already appear in the path expression ordering 348 in path expressions resulting from the outer join candidate portions of the path expression ordering 348. This produces the following path expression grouping 356:

a, a.rf, a.rf.rg, a.rb, a.rb.rc, b, a.rd, a.rd.re

A quantifier is then created for each path expression in the grouping wherein each quantifier comprises a variable representing a table in a relational database. A quantifier q1 358 is created for a table A; q2 360 for table F; q3 362 for table G; q4 364 for table B; q5 366 for table C; q6 368 for table B; q7 370 for table D; and q8 372 for table E. In the quantifier grouping 358 through 372, each grouped quantifier is replaced with the quantifier and its corresponding related table in a relational database to produce the following table-quantifier sequence 374:

A q1 LOJ F q2 LOJ G q3 LOJ B q4 LOJ C q5 LOJ B q6 LOJ D q7 LOJ E q8

An optimization may then be performed upon the table-quantifier sequence 374 to determine quantifiers which are a candidate for an inner join. The use of an outer join decreases performance of an EJB query in the database. The preferred embodiment of the present invention analyzes the EJB query, and identifies situations in which an outer join can be converted to an inner join in order to improve the performance of the EJB query. The preferred embodiment analyzes portions of a path expression and applies the following rules to the analyzed portions of a path expression to determine which outer joins to convert to inner joins:

If a corresponding path expression is used in a FROM clause, then build as an inner join.

If a LIKE, IN, or BETWEEN operator exists in a WHERE clause containing a corresponding path expression, then build as an inner join.

If an EQUAL, LESS THAN, GREATER THAN, LESS THAN OR EQUAL, GREATER THAN OR EQUAL, NOT EQUAL, or NOT NULL operator exits in a WHERE clause, then build as an inner join.

In EJB query 302, "b", "a.rd", and "d.re" are path expressions used in FROM clause. Thus, "b", "a.rd", and "d.re" along with their corresponding tables and quantifiers are candidates for an inner join. The inner join optimization would also move the inner join candidates to the end of the table-quantifier sequence; however, that is not necessary in this example as the inner join candidates are already at the end of the table-quantifier sequence. The inner join optimization yields the following optimized table-quantifier sequence 376:

A q1 LOJ F q2 LOJ G q3 LOJ B q4 LOJ C q5, B q6, D q7, E q8

Alternatively, table-quantifier sequence 376 may be directly generated by the above replacing step in lieu of table quantifier 374 if during the replacing step, path expressions used in a WHERE clause are replaced by an inner join of the table and quantifier, and moved to the end of the table-quantifier sequence.

A translation of the object oriented query to a relational query based upon this table-quantifier sequence 376 is then completed to produce the following relational query 378 in which q3.* means return all columns for table C and in which table G is assumed to have a primary key of "pkey":

---

Select q5.* from A q1 LOJ F q2 LOJ G q3 LOJ B q4 LOJ C q5, B q6, D q7, E q8
    where (q8."name" = 'EJBQuery") and
        (q3."pkey" is NULL) and
        (q8.fk = q7.pk) and
        (q6."name" = q1."name") and
        (Q7.pk = q1.fk)

---

The following second example illustrates a translation of an EJB query 402 with a WHERE clause containing an EQUAL operator and a NULL operator which is executed over the EJB model 200:

---

EJB Query
Select a.rd.re from BeanA a
    where a.rd.re.name = "EJBQuery" and
    a.rd.rh.name is null.

---

The preferred embodiment of the present invention translates this EJB query into the following SQL query:

---

SQL Query
Select q3.* from A q1 LOJ D q2 LOJ H q4, E q3
    where (q3."name" = "EJBQuery") and
    (q4."name" is NULL)

---

More specifically, the EJB query 402 contains four path expressions, "a.rd.re" 404 in the SELECT clause 406, "a" 408 in the FROM clause 410, and "a.rd.re" 412 and "a.rd.rh" 414 in the WHERE clause 416. In accordance with the preferred embodiment of the present invention, each of these path expressions (404, 408, 412, and 414) comprising navigation paths through relationships in a schema in the object oriented query 402 are translated to either a relational database outer join or a relational database inner join by the performance of the following described process. The process begins by identifying each path expression defined in each level of the object oriented query to identify path expressions for analysis. The process identifies the path expressions "a.rd.re" 404 in the SELECT clause 406, "a.rd.re" 412 in the WHERE clause 416, and "a.rd.rh" 414 in the WHERE clause 416 resulting in the list of identified path expressions 418.

The list of identified path expressions 418 is then analyzed to yield a path analysis of the FROM. SELECT, and WHERE clause path expressions. The path expression analysis produces a list 420 of path expressions to be evaluated as candidates for translation to an outer join comprising "a", "a.rd", "a.rd.re", and "a.rd.rh".

From the list produced by the path expression analysis 420, each of path expression is evaluated to determine if the identified path expression is a candidate for a translation to an outer join. This analysis applies rules, including but not limited to the following rules, to determine if the identified path expression is a candidate for a translation to an outer join:

If the path expression is in a SELECT, GROUP BY, ORDER BY, or HAVING clause;

If the path expression is in a WHERE clause with a NULL or OR operator;

If the path expression is in a WHERE clause which is NULL; or

If the path expression is in an outer join in a WHERE clause, then outer join candidate.

Applying these rules to the identified path expressions "a.rd.re" 404, "a.rd.re" 412, and "a.rd.rh" 414 of the list 420 of path expressions to be evaluated as candidates for translation to an outer join produces a list of outer join candidates 422 comprising the path expressions "a.rd", "a.rd.re", and "a.rd.rh".

The path expressions are ordered beginning with the path expressions defined in the FROM clause 410, to which are concatenated the path expressions 422 identified as candidates for a translation to an outer join from any WHERE clause 416 or any SELECT clause 406, to which are concatenated any remaining path expressions from any WHERE clause 416 or any SELECT clause 406 which are not identified as candidates for a translation to an outer join. The FROM clause 410 ordering comprises a 408 resulting in an initial sequence of path expressions "a" 424 to which is concatenated the path expressions from the WHERE clause 416 and SELECT clause 406 identified as a candidate for a translation to an outer join. The path expressions identified as a candidate for a translation to an outer join comprise path expressions "a.rd" 426, "a.rd.re" 428, and "a.rd.rh" 430. The remaining path expression from the WHERE clause 416 and SELECT clause 406 which is not identified as a candidate for a translation to an outer join is path expressions "a.rd.re" 432. This produces the following path expression ordering 434:

a, a.rd, a.rd.re, a.rd.rh, a.rd.re

These ordered path expressions 434 are input to a select operator for each level of an object oriented query, and the ordered path expressions 434 are grouped sequentially based upon the identifications as a candidate for a translation to an outer join (outer join candidates preceding inner join candidates), and based upon a source-target dependency between the ordered path expressions 434. In this source-target dependency ordering, a source of a relationship precedes a target of a relationship, i.e., a 436 representing the source BeanA 202 of the hierarchy preceding all other path expressions, and a.rd 438 preceding a.rd.re 440 due to BeanD 208 being the target and BeanA 202 being the source in relationship rd 236 and due to BeanE 210 being the target and BeanD 208 being the source in relationship re 242. The source-target dependency ordering also causes a.rd.re 440 to precede "a.rd.rh" 442. Duplicate path expressions are also eliminated. In this example, duplicate "a.rd.re" 432 is eliminated from the path expressions resulting from the SELECT clause 406 as "a.rd.re" 428 already appears in the path expression ordering 434 in path expressions resulting from the outer join candidate portions of the path expression ordering 434. This produces the following path expression grouping 444:

a, a.rd, a.rd.re, a.rd.rh

A quantifier is then created for each path expression in the grouping wherein each quantifier comprising a variable representing a table in a relational database. A quantifier q1 446 is created for a table A; q2 448 for table D; q3 450 for table E; and q4 452 for table H. In the quantifier grouping 446 through 452, each grouped quantifier is replaced with the quantifier and its corresponding related table in a relational database to produce the following table-quantifier sequence 454:

A q1 LOJ D q2 LOJ E q3 LOJ H q4

The optimization upon the table-quantifier sequence 454 is performed to determine quantifiers which are a candidate for an inner join. In EJB query 402, "a.rd.re" is a path expression used in a WHERE clause containing an EQUAL operator, and "a.rd.re" along with its corresponding table and quantifier are candidates for an inner join which are moved to the end of the table-quantifier sequence yielding the following optimized table-quantifier sequence 456:

A q1 LOJ D q2 LOJ H q4, E q3

A translation of the object oriented query to a relational query based upon this table-quantifier sequence 456 is then completed to produce the following relational query 458 in which q3.* means return all columns for table E:

---

Select q3.* from A q1 LOJ D q2 LOJ H q4, E q3
where (q3."name" = 'EJBQuery") and
(q4."name" is NULL)

---

Referring now to FIGS. 5, 6, 7, and 8, the flowcharts 500, 600, 700, and 800 illustrate the operations preferred in carrying out the preferred embodiment of the present invention. In the flowcharts, the graphical conventions of a diamond for a test or decision and a rectangle for a process or function are used. These conventions are well understood by those skilled in the art, and the flowcharts are sufficient to enable one of ordinary skill to write code in any suitable computer programming language.

After the start 505 of the process 500, process block 510 analyzes each path expression defined in each level of the object oriented query, and process block 515 identifies each path expression which can be a candidate for a translation to an outer join. Process block 520 then orders the path expressions starting with path expressions defined in a FROM clause, adding to the FROM clause path expressions, each path expression identified as a candidate for a translation to an outer join, and making the ordered path expressions as input to a select operator for each level of the object oriented query. Process block 525 groups the ordered path expressions sequentially based upon on a source-target dependency between ordered path expressions and based upon the identifications as a candidate for a translation to an outer join. Process block 530 creates a quantifier for each path expression, said quantifier comprising a variable representing a table in a relational database. Thereafter, process block 535 replaces each grouped quantifier with a related table in a relational database. Process block 540 then completes a translation of the object oriented query to a relational query. The process ends at process block 535.

Figure 6:
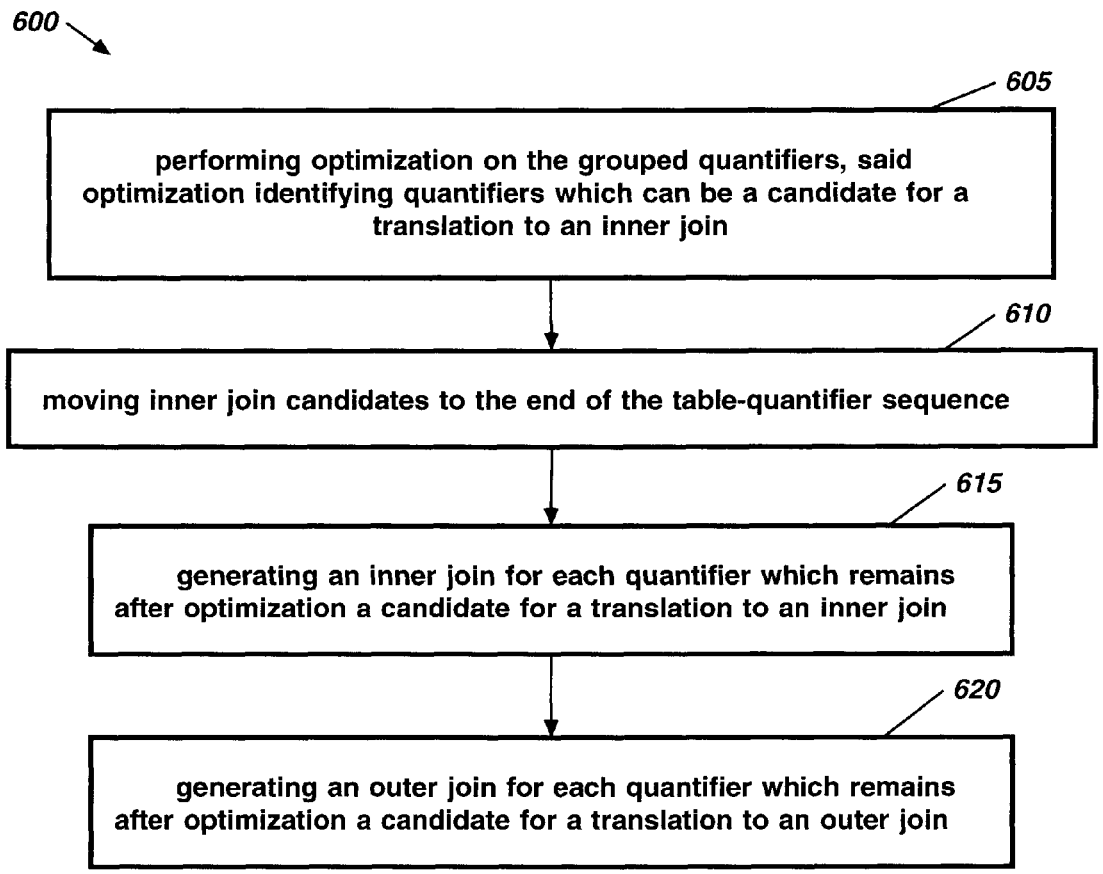

Referring now to FIG. 6, the flowchart 600 illustrates the optimization which may be performed after process block 535 and before process block 540 in an alternative embodiment of the present invention. After process block 535 replaces each grouped quantifier with a related table in a relational database, process block 605 performs optimization on the grouped quantifiers, said optimization identifying quantifiers which can be a candidate for a translation to an inner join. Thereafter, process block 610 moves inner join candidates to the end of the table-quantifier sequence, and process block 615 generates an inner join for each quantifier which remains after optimization a candidate for a translation to an inner join. Process block 620 generates an outer join for each quantifier which remains after optimization a candidate for a translation to an outer join. Processing then continues to process block 540 which completes the translation of the object oriented query to a relational query.

Figure 7:
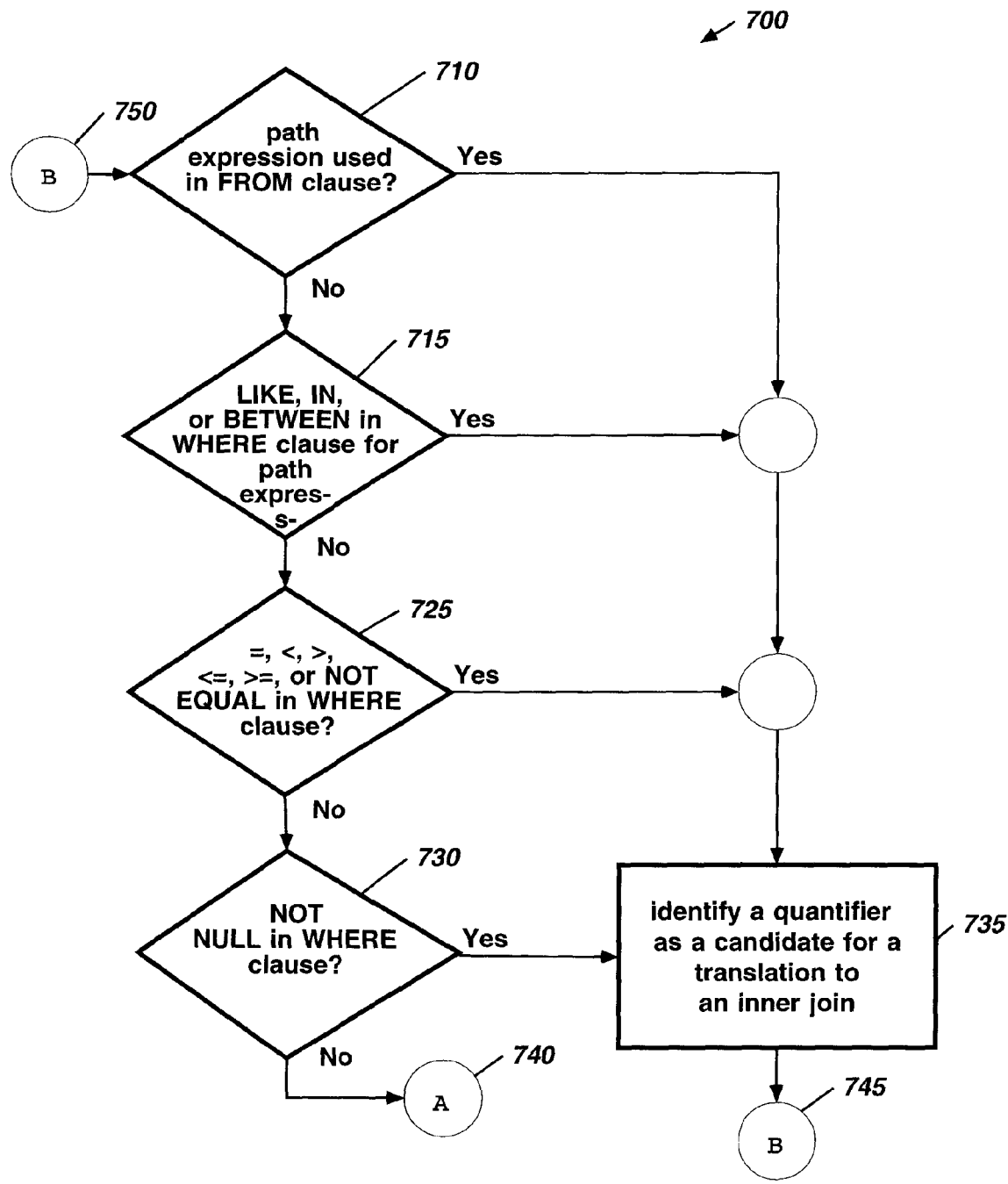
Figure 8:
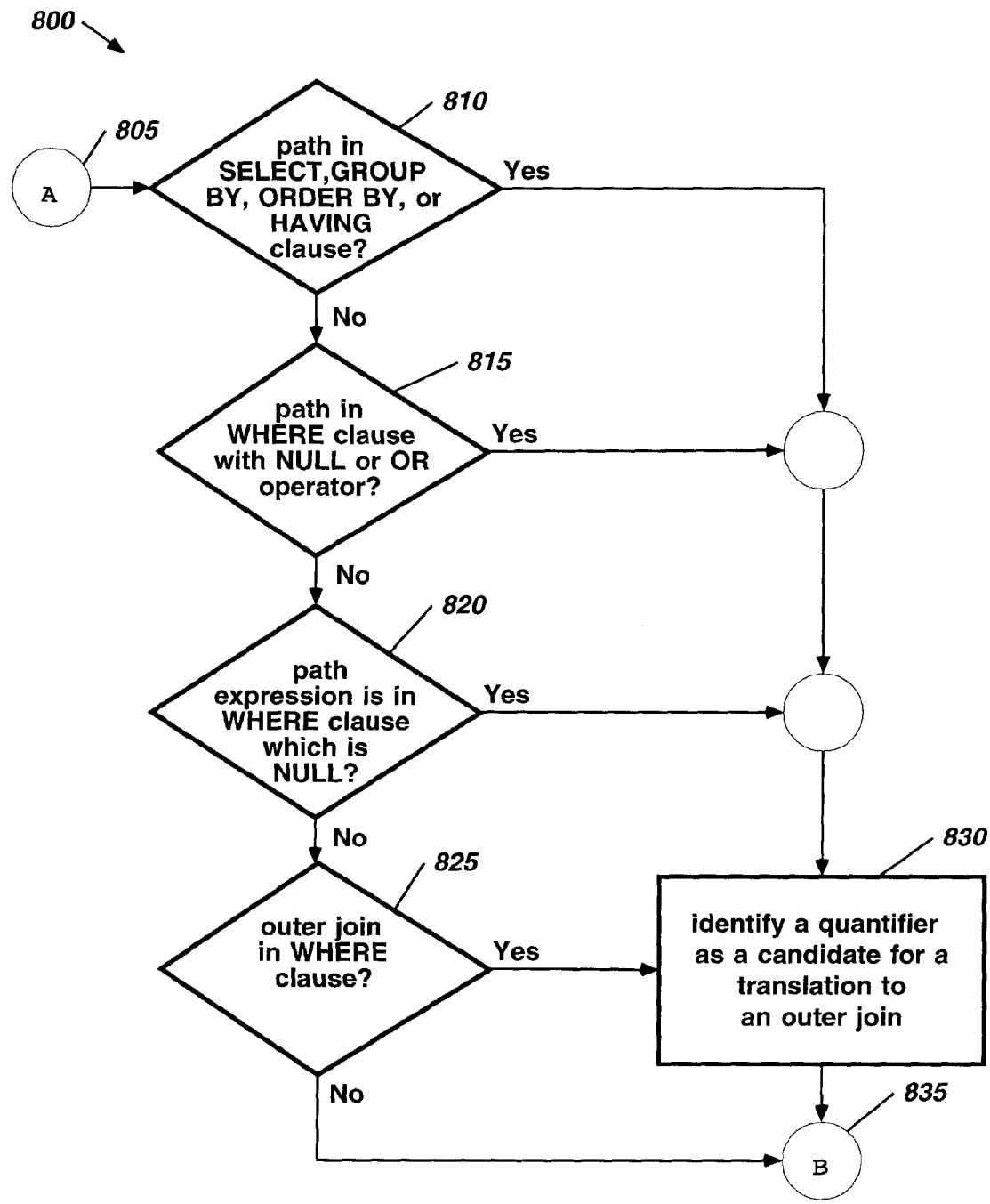

FIG. 7 and FIG. 8 illustrate an expansion of process block 605 which performs the optimization on the grouped quantifiers to identify the quantifiers which can be a candidate for a translation to an inner join. Decision block 705 through decision block 730 implement rules which process each quantifier and identify a quantifier as a candidate for a translation to an inner join, and decision block 810 through decision block 825 implement rules which process each quantifier and identify a quantifier as a candidate for a translation to an outer join.

Referring now to FIG. 7, flowchart 700 illustrates the rules which identify a quantifier as a candidate for a translation to an inner join. Decision block 710 determines if a corresponding path expression is used in a FROM clause. If not, then decision block 715 determines if a LIKE, IN, or BETWEEN operator exists in a WHERE clause containing a corresponding path expression. If not, then decision block 725 determines if a WHERE clause contains an EQUAL, LESS THAN, GREATER THAN, LESS THAN OR EQUAL, GREATER THAN OR EQUAL, NOT EQUAL. If not, then decision block 730 determines if a NOT NULL operator exits in a WHERE clause. If not, then control passes to decision block 810 on FIG. 8, illustrated by flowchart connectors A, 740 on FIGS. 7 and 805 on FIG. 8.

Returning now to decision block 710 through decision block 730, if any of these decision blocks determine that the tested condition is true, then control passes to process block 735 which identifies the quantifier as a candidate for a translation to an inner join. Control then returns to decision block 710 to process the next quantifier, illustrated by flowchart connectors B, 745 and 750 on FIG. 7.

Referring now to FIG. 8, flowchart 800 illustrates the rules which identify a quantifier as a candidate for a translation to an outer join. Decision block 810 determines if the path expression is in a SELECT, GROUP BY, ORDER BY, or HAVING clause. If not, then decision block 815 determines if the path expression is in a WHERE clause with a NULL or OR operator. If not, then decision block 820 determines if the path expression is in a WHERE clause which is NULL. If not, then decision block 825 determines if an outer join is in a WHERE clause. If not, then control returns to decision block 705 on FIG. 7 to process the next quantifier. This is illustrated by flowchart connectors B, 835 on FIGS. 8 and 750 on FIG. 7.

Returning now to decision block 810 through decision block 825, if any of these decision blocks determine that the tested condition is true, then control passes to process block 830 which identifies the quantifier as a candidate for a translation to an outer join. Thereafter, control returns to decision block 705 on FIG. 7 to process the next quantifier. This is illustrated by flowchart connectors B, 835 on FIGS. 8 and 750 on FIG. 7.

Figure 9:
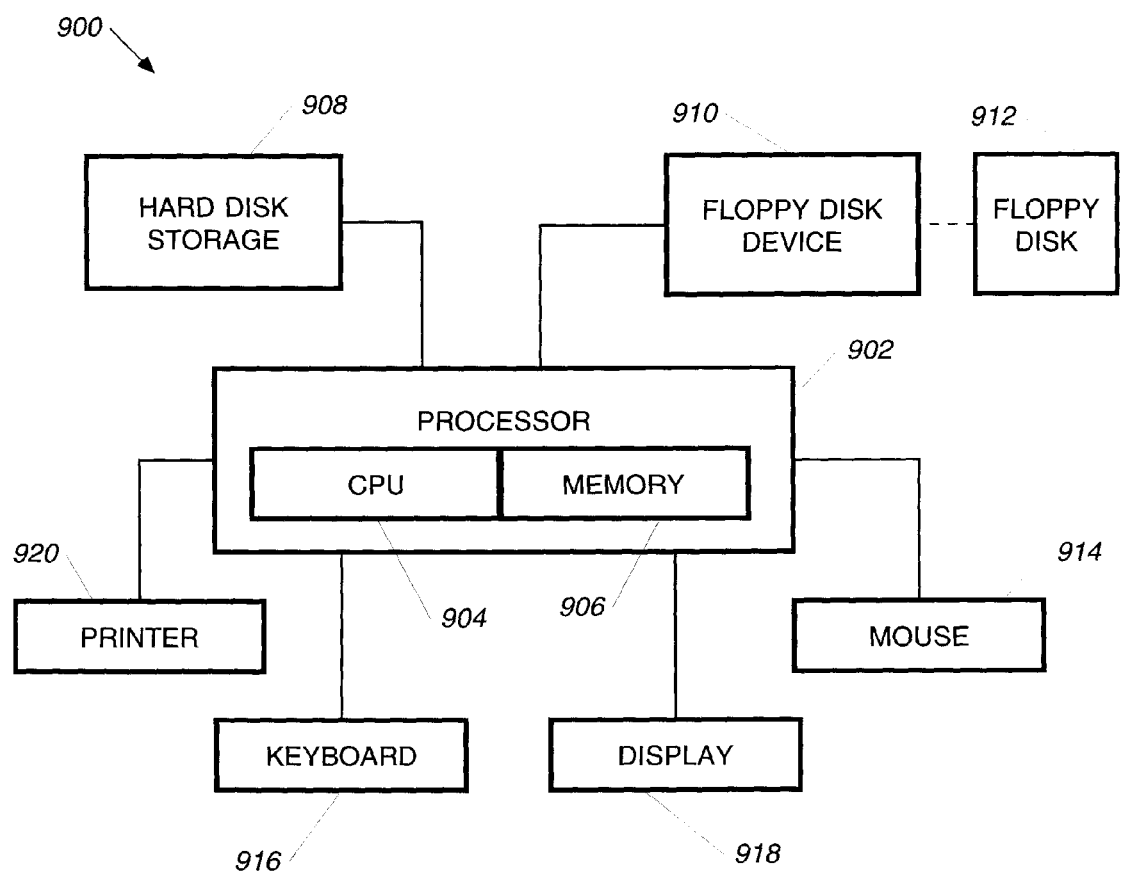
FIG. 9 is a block diagram of a computer system used in performing a method of a preferred embodiment of the present invention, forming part of an apparatus of a preferred embodiment of the present invention, storing a data structure of a preferred embodiment of the present invention, and which may use an article of manufacture comprising a computer-readable storage medium having a computer program embodied in said medium which may cause the computer system to practice a preferred embodiment of the present invention.

With reference now to the figures, and in particular with reference to FIG. 9, there is depicted a pictorial representation of a computer system 900 which may be utilized to implement a method, system, article of manufacture, data structure, and computer program product of preferred embodiments of the present invention. The block diagram of FIG. 9 illustrates a computer system 900 used in performing the method of the present invention, forming part of the apparatus of the present invention, and which may use the article of manufacture comprising a computer-readable storage medium having a computer program embodied in said medium which may cause the computer system to practice the present invention. The computer system 900 includes a processor 902, which includes a central processing unit (CPU) 904, and a memory 906. Additional memory, in the form of a hard disk file storage 908 and a computer-readable storage device 910, is connected to the processor 902. Computer-readable storage device 910 receives a computer-readable storage medium 912 having a computer program embodied in said medium which may cause the computer system to implement the present invention in the computer system 900. The computer system 900 includes user interface hardware, including a mouse 914 and a keyboard 916 for allowing user input to the processor 902 and a display 918 for presenting visual data to the user. The computer system may also include a printer 920.

Using the foregoing specification, the invention may be implemented using standard programming and/or engineering techniques using computer programming software, firmware, hardware or any combination or sub-combination thereof. Any such resulting program(s), having computer readable program code means, may be embodied within one or more computer usable media such as fixed (hard) drives, disk, diskettes, optical disks, magnetic tape, semiconductor memories such as Read-Only Memory (ROM), Programmable Read-Only Memory (PROM), etc., or any memory or transmitting device, thereby making a computer program product, i.e., an article of manufacture, according to the invention. The article of manufacture containing the computer programming code may be made and/or used by executing the code directly or indirectly from one medium, by copying the code from one medium to another medium, or by transmitting the code over a network. An apparatus for making, using, or selling the invention may be one or more processing systems including, but not limited to, central processing unit (CPU), memory, storage devices, communication links, communication devices, servers, input/output (I/O) devices, or any sub-components or individual parts of one or more processing systems, including software, firmware, hardware or any combination or sub-combination thereof, which embody the invention as set forth in the claims. User input may be received from the keyboard, mouse, pen, voice, touch screen, or any other means by which a human can input data to a computer, including through other programs such as application programs, databases, data sets, or files.

One skilled in the art of computer science will easily be able to combine the software created as described with appropriate general purpose or special purpose computer hardware to create a computer system and/or computer sub-components embodying the invention and to create a computer system and/or computer sub-components for carrying out the method of the invention. Although the present invention has been particularly shown and described with reference to a preferred embodiment, it should be apparent that modifications and adaptations to that embodiment may occur to one skilled in the art without departing from the spirit or scope of the present invention as set forth in the following claims.

We claim:

1. An article of manufacture for use in a computer system for translating a path expression in an object oriented query to a relational database outer join, said path expression comprising a navigation path through a relationship in a schema, said article of manufacture comprising a computer-useable storage medium having a computer program embodied in said medium which causes the computer system to perform:

analyzing each path expression defined in each level of the object oriented query;

identifying each path expression which can be a candidate for a translation to an outer join;

ordering the path expression starting with path expression defined in a FROM clause, adding to the FROM clause path expression, each path expression identified as a candidate for a translation to an outer join, and making the ordered path expressions as input to a select operator for each level of the object oriented query;

grouping the ordered path expressions sequentially based upon on a source-target dependency between ordered path expressions and based upon the identifications as a candidate for a translation to an outer join;

creating a quantifier for each path expression, said quantifier comprising a variable representing a table in a relational database;

replacing each grouped path expression with a corresponding quantifier and related table in a relational database;

performing optimization on grouped quantifiers, said optimization identifying quantifiers which can be a candidate for a translation to an inner join;

generating an outer join for each quantifier which remains after optimization a candidate for a translation to an outer join;

generating an inner join for each quantifier which remains after optimization a candidate for a translation to an inner join; and completing a translation of the object oriented query to a relational query.

2. The article of manufacture of claim 1, wherein the optimization identifies a quantifier as a candidate for a translation to an inner join if a corresponding path expression is used in a FROM clause.

3. The article of manufacture of claim 1, wherein the optimization identifies a quantifier as a candidate for a translation to an inner join if a LIKE, IN, or BETWEEN operator exists in a WHERE clause containing a corresponding path expression.

4. The article of manufacture of claim 1, wherein the optimization identifies a quantifier as a candidate for a translation to an inner join if an EQUAL, LESS THAN, GREATER THAN, LESS THAN OR EQUAL, GREATER THAN OR EQUAL, NOT EQUAL, or NOT NULL operator exits in a WHERE clause.

5. A computer system including a computer readable storage medium having instructions executed by a processor for translating a path expression in an object oriented query to a relational database outer join, said path expression comprising a navigation path through a relationship in a schema, wherein the computer readable storage medium includes:
   computer program instructions for analyzing each path expression defined in each level of the object oriented query;
   computer program instructions for identifying each path expression which can be a candidate for a translation to an outer join;
   computer program instructions for ordering the path expressions starting with path expressions defined in a FROM clause, adding to the FROM clause path expressions, each path expression identified as a candidate for a translation to an outer join, and making the ordered path expressions as input to a select operator for each level of the object oriented query;
   computer program instructions for grouping the ordered path expressions sequentially based upon on a source-target dependency between ordered path expressions and based upon the identifications as a candidate for a translation to an outer join;
   computer program instructions for creating a quantifier for each path expression, said quantifier comprising a variable representing a table in a relational database;
   computer program instructions for replacing each grouped path expression with a corresponding quantifier and related table in a relational database;
   computer program instructions for performing optimization on grouped quantifiers, said optimization identifying quantifiers which can be a candidate for a translation to an inner join;
   computer program instructions for generating an outer join for each quantifier which remains after optimization a candidate for a translation to an outer join;
   computer program instructions for generating an inner join for each quantifier which remains after optimization a candidate for a translation to an inner join; and
   computer program instructions for completing a translation of the object oriented query to a relational query.

6. The computer system of claim 5, wherein the optimization identifies a quantifier as a candidate for a translation to an inner join if a corresponding path expression is used in a FROM clause.

7. The computer system of claim 5, wherein the optimization identifies a quantifier as a candidate for a translation to an inner join if a LIKE, IN, or BETWEEN operator exists in a WHERE clause containing a corresponding path expression.

8. The computer system of claim 5, wherein the optimization identifies a quantifier as a candidate for a translation to an inner join if an EQUAL, LESS THAN, GREATER THAN, LESS THAN OR EQUAL, GREATER THAN OR EQUAL, NOT EQUAL, or NOT NULL operator exits in a WHERE clause.

* * * * *